(12) United States Patent
Frantz et al.

(10) Patent No.: US 8,543,538 B2
(45) Date of Patent: Sep. 24, 2013

(54) SYSTEMS AND METHODS FOR REDISTRIBUTING DATA IN A RELATIONAL DATABASE

(75) Inventors: Jason Frantz, San Francisco, CA (US);
Sergei Tsarev, San Francisco, CA (US);
Jim Gale, San Francisco, CA (US);
Scott Smith, San Francisco, CA (US)

(73) Assignee: Clustrix, Inc., San Francisco, CA (US)

( * ) Notice: Subject to any disclaimer, the term of this patent is extended or adjusted under 35 U.S.C. 154(b) by 76 days.

(21) Appl. No.: 13/151,189

(22) Filed: Jun. 1, 2011

(65) Prior Publication Data

US 2012/0310986 A1    Dec. 6, 2012

(51) Int. Cl.
*G06F 17/30*    (2006.01)

(52) U.S. Cl.
USPC .......................................... 707/609; 707/966

(58) Field of Classification Search
USPC .......................................... 707/799, 609, 966
See application file for complete search history.

(56) References Cited

U.S. PATENT DOCUMENTS

| | | | |
|---|---|---|---|
| 5,761,652 A * | 6/1998 | Wu et al. | |
| 5,878,409 A * | 3/1999 | Baru et al. | |
| 6,112,198 A * | 8/2000 | Lohman et al. | |
| 7,801,848 B2 * | 9/2010 | Hazlewood et al. | 707/609 |
| 8,078,825 B2 * | 12/2011 | Oreland et al. | 711/173 |
| 8,099,440 B2 * | 1/2012 | Johnson et al. | 707/802 |
| 8,195,644 B2 * | 6/2012 | Xu | 707/714 |
| 2007/0143380 A1 * | 6/2007 | Plow et al. | 707/206 |
| 2012/0203740 A1 * | 8/2012 | Ben-Dyke et al. | 707/639 |

OTHER PUBLICATIONS

Manku, Approximate Medians and other Quantiles in One Pass and with Limited Memory, 1998, pp. 426-435.*

* cited by examiner

*Primary Examiner* — Albert Phillips, III
(74) *Attorney, Agent, or Firm* — Knobbe Martens Olson & Bear LLP

(57) ABSTRACT

Systems and methods for redistributing data in a relational database are disclosed. In one embodiment, the database includes a plurality of rows of data distributed across a plurality of slices of a table in the database. The database system is configured to distribute the rows of data across the slices according to a first function based on one or more columns of the database. The database system monitors at least one database statistic indicative of variation in a distribution of the rows of data across the slices and detects a redistribution condition based on the at least one monitored database statistic. The database system is further configured to respond to the detected redistribution condition by redistributing the rows of data across the slices according to a second function based on a different number of columns than the first function.

20 Claims, 11 Drawing Sheets

*900*

| representation | low | high | location | rows | |
|---|---|---|---|---|---|
| messages | 0 | 31 | 0 | 1 | 960a |
| messages | 32 | 63 | 1 | 1 | 960b |
| messages | 64 | 95 | 2 | 1 | 960c |
| messages | 96 | 127 | 3 | 1 | 960d |
| messages | 128 | 191 | 4 | 1 | 960e |
| messages | 192 | 255 | 5 | 1 | 960f |
| ... | ... | ... | ... | ... | |
| locked_index | 0 | 63 | 20 | 2 | 980a |
| locked_index | 64 | 127 | 21 | 1 | 980b |
| locked_index | 128 | 191 | 22 | 1 | 980c |
| locked_index | 192 | 255 | 23 | 2 | 980d |

910   920   930   940   950

600

| mid | uid | read | locked | text | |
|---|---|---|---|---|---|
| 0 | 0 | 0 | 0 | A | 660a |
| 1 | 1 | 0 | 0 | B | 660b |
| 2 | 2 | 0 | 0 | C | 660c |
| 3 | 2 | 1 | 0 | D | 660d |
| 4 | 3 | 1 | 0 | E | 660e |
| 5 | 3 | 1 | 1 | F | 660f |
| 610 | 620 | 630 | 640 | 650 | |

| uid | read | mid | |
|---|---|---|---|
| 0 | 0 | 0 | 710a |
| 1 | 0 | 1 | 710b |
| 2 | 0 | 2 | 710c |
| 2 | 1 | 3 | 710d |
| 3 | 1 | 4 | 710e |
| 3 | 1 | 5 | 710f |
| 620 | 630 | 610 | |

*Fig. 7*

| representation | low | high | location | rows | |
|---|---|---|---|---|---|
| messages | 0 | 31 | 0 | 1 | 960a |
| messages | 32 | 63 | 1 | 1 | 960b |
| messages | 64 | 95 | 2 | 1 | 960c |
| messages | 96 | 127 | 3 | 1 | 960d |
| messages | 128 | 191 | 4 | 1 | 960e |
| messages | 192 | 255 | 5 | 1 | 960f |
| ... | ... | ... | ... | ... | |
| locked_index | 0 | 63 | 10 | 6 | 970a |
| locked_index | 64 | 127 | 11 | 0 | 970b |
| locked_index | 128 | 191 | 12 | 0 | 970c |
| locked_index | 192 | 255 | 13 | 0 | 970d |
| 910 | 920 | 930 | 940 | 950 | |

1000

| value | rows |
|-------|------|
| 0 | 5 |
| 1 | 1 |
| 2 | 0 |
| 3 | 0 |
| 4 | 0 |
| 5 | 0 |

| value | rows |
|-------|------|
| 0 | 1 |
| 1 | 1 |
| 2 | 1 |
| 3 | 1 |
| 4 | 1 |
| 5 | 1 |

| slice | hashes | rows | ratio |
|---|---|---|---|
| 10 | 64 | 5 | 0.078125 | 1250a
| 11 | 64 | 1 | 0.015625 | 1250b
| 12 | 64 | 0 | 0 | 1250c
| 13 | 64 | 0 | 0 | 1250d 1210  1220  1230  1240

| slice | hashes | rows | ratio |
|---|---|---|---|
| 0 | 32 | 1 | 0.03125 | 1350a
| 1 | 32 | 1 | 0.03125 | 1350b
| 2 | 32 | 1 | 0.03125 | 1350c
| 3 | 32 | 1 | 0.03125 | 1350d
| 4 | 64 | 1 | 0.015625 | 1350e
| 5 | 64 | 1 | 0.015625 | 1350f 1310  1320  1330  1340

| representation | low | high | location | rows | |
|---|---|---|---|---|---|
| messages | 0 | 31 | 0 | 1 | 960a |
| messages | 32 | 63 | 1 | 1 | 960b |
| messages | 64 | 95 | 2 | 1 | 960c |
| messages | 96 | 127 | 3 | 1 | 960d |
| messages | 128 | 191 | 4 | 1 | 960e |
| messages | 192 | 255 | 5 | 1 | 960f |
| ... | ... | ... | ... | ... | |
| locked_index | 0 | 63 | 20 | 2 | 980a |
| locked_index | 64 | 127 | 21 | 1 | 980b |
| locked_index | 128 | 191 | 22 | 1 | 980c |
| locked_index | 192 | 255 | 23 | 2 | 980d |

| slice | hashes | rows | ratio | |
|---|---|---|---|---|
| 10 | 64 | 2 | 0.03125 | 1260a |
| 11 | 64 | 1 | 0.015625 | 1260b |
| 12 | 64 | 1 | 0.015625 | 1260c |
| 13 | 64 | 2 | 0.03125 | 1260d |

SYSTEMS AND METHODS FOR REDISTRIBUTING DATA IN A RELATIONAL DATABASE

CROSS-REFERENCE TO RELATED APPLICATIONS

This application is related to a nonprovisional U.S. patent application entitled "SYSTEMS AND METHODS FOR RESLICING DATA IN A RELATIONAL DATABASE," filed Jun. 1, 2011 Ser. No. 13/151,203, which is hereby expressly incorporated by reference in its entirety.

BACKGROUND

1. Field

The present application relates to systems and methods for redistributing data in a relational database.

2. Description of the Related Art

A relational database can include data in the form of representations, which can refer herein to tables (or "relations") and indices. A relation is a data structure which consists of a heading and an ordered or unordered set of tuples which share the same type. An index is a copy of one part of a table that can improve the speed of data retrieval operations by ordering the data in that part of the table. Representations can be organized into rows and columns. A database system can include a plurality of nodes, each of which can hold a portion of the data in the database. A node is a physical hardware component, which can include one or more processing elements, memory elements, and/or storage drives. Data in a representation can be stored entirely on one node. Alternatively, the data of a representation can be distributed among a plurality of nodes in sub-tables, which can be referred to as slices and can be spread throughout the plurality of nodes. By distributing data in a relational database across the slices, the scalability, reliability, availability and/or performance of the relational database can be improved.

There is a need for improved systems and methods of redistributing data in a relational database system. Additionally, there is a need for improving the performance of database queries in multi-node database systems.

SUMMARY

The systems, methods and devices of the present disclosure each have several innovative aspects, no single one of which is solely responsible for the desirable attributes disclosed herein.

In one embodiment, a method of redistributing data in a distributed database is disclosed. The distributed database includes a plurality of rows of data distributed across a plurality of slices of a table in the database. The method includes distributing the rows of data across the slices according to a first function based on one or more columns of the database, and monitoring at least one database statistic indicative of variation in a distribution of the rows of data across the slices. The method further includes detecting a redistribution condition based on the at least one monitored database statistic, and responding to the detected redistribution condition by redistributing the rows of data across the slices according to a second function based on a different number of columns than the first function. The method is performed by one or more computing devices.

In another embodiment, a distributed database system is disclosed. The distributed database system includes a plurality of rows of data distributed across a plurality of slices of a table in the database. The distributed database system further includes one or more processors. The one or more processors are configured to distribute the rows of data across the slices according to a first function based on one or more columns of the database, and to monitor at least one database statistic indicative of variation in a distribution of the rows of data across the slices. The one or more processors are further configured to detect a redistribution condition based on the at least one monitored database statistic, and to respond to the detected redistribution condition by redistributing the rows of data across the slices according to a second function based on a different number of columns than the first function.

In another embodiment, a computer-readable non-transitory storage medium is disclosed. The computer-readable non-transitory storage medium includes code capable of causing one or more processors to distribute a plurality rows of data across a plurality of slices of a table in a database according to a first function based on one or more columns of the database, and to monitor at least one database statistic indicative of variation in a distribution of the rows of data across the slices. The computer-readable non-transitory storage medium further includes code capable of causing one or more processors to detect a redistribution condition based on the at least one monitored database statistic, and to respond to the detected redistribution condition by redistributing the rows of data across the slices according to a second function based on a different number of columns than the first function.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Specific embodiments of the invention will now be described with reference to the following drawings, which are provided by way of example, and not limitation.

FIG. 6 is a schematic diagram illustrating a state of a messages table in accordance with one embodiment.

FIG. 7 is a schematic diagram illustrating a state of a uid_index representation of the messages table of FIG. 6.

FIG. 10 is a schematic diagram illustrating a state of a "hot-list" for a 'locked' column of the messages table of FIG. 6.

FIG. 11 is a schematic diagram illustrating a state of a "hot-list" for a 'mid' column of the messages table of FIG. 6.

FIG. 12 is a schematic diagram illustrating a state of a slice range weight table, before redistribution, for the locked_index representation of FIG. 8.

FIG. 13 is a schematic diagram illustrating a state of a slice range weight table for the messages table of FIG. 6.

FIG. 16 is a schematic diagram illustrating a state of the hash ranges table of FIG. 9, after redistribution, in accordance with one embodiment.

FIG. 17 is a schematic diagram illustrating a state of a slice range weight table, after redistribution, for the locked_index representation of FIG. 8.

DETAILED DESCRIPTION

Figure 1:
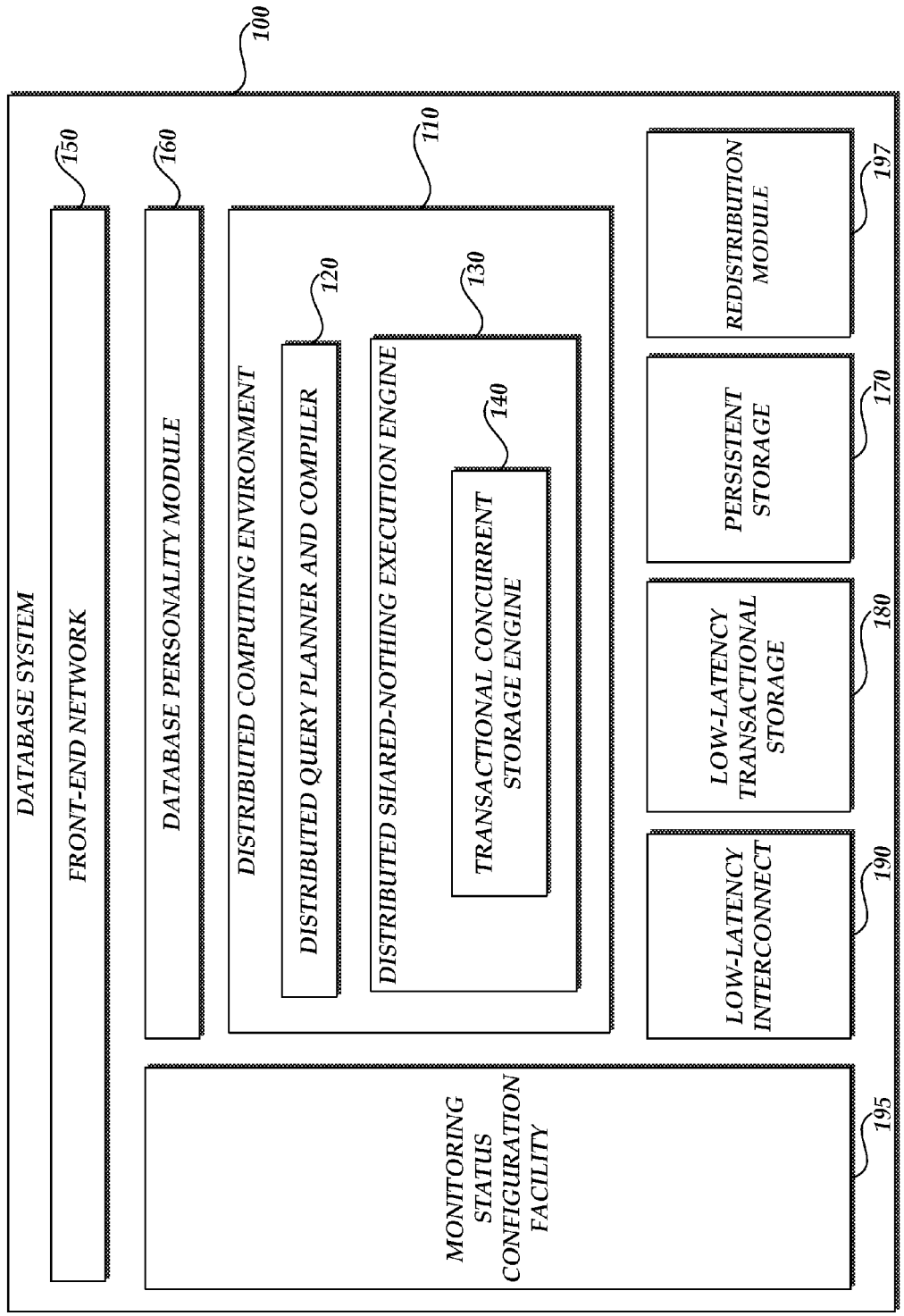
FIG. 1 is a schematic diagram of one example of a relational database system.

The following detailed description presents various descriptions of specific embodiments of the invention. However, the invention can be embodied in a multitude of different ways as defined and covered by the claims. In this description, reference is made to the drawings where like reference numerals indicate identical or functionally similar elements.

Relational Database Overview

FIG. 1 is a schematic diagram of one example of a relational database system 100. The illustrated database system 100 includes a distributed computing environment 110 that includes a distributed query planner and compiler 120 and a distributed shared-nothing execution engine 130. The distributed shared-nothing execution engine 130 includes a transactional concurrent storage engine 140. In the illustrated embodiment, queries enter the database system 100 through a front-end network 150 and are translated by a database personality module 160 to an internal representation used by the distributed computing environment 110. The distributed computing environment 110 then executes the queries in parallel. The database system 100 uses a persistent storage 170 to store data, a low-latency transactional storage 180 to journal changes, and a low-latency interconnect 190 to communicate with other nodes in a cluster. In an embodiment, a monitoring, status, and configuration facility 195 is integrated into the database system 100. The database 100 can also include a redistribution module 197, which can be configured to perform a redistribution operation in which rows of data in a plurality of slices of a representation can be redistributed among the slices. In an embodiment, the redistribution module 197 can be included in the distributed computing environment 110.

The database system 100 can include data organized in a collection of representations, which can include tables, and indices. The representations can each include one or more rows and one or more columns. Each column can represent an attribute of the representation, and each row can include a value associated with each column of the representation. The values can be in any suitable format, including, for example, numbers, character strings and/or a time format. The database system 100 can also include a plurality of nodes, each of which can hold a portion of the data in the database.

Figure 2:
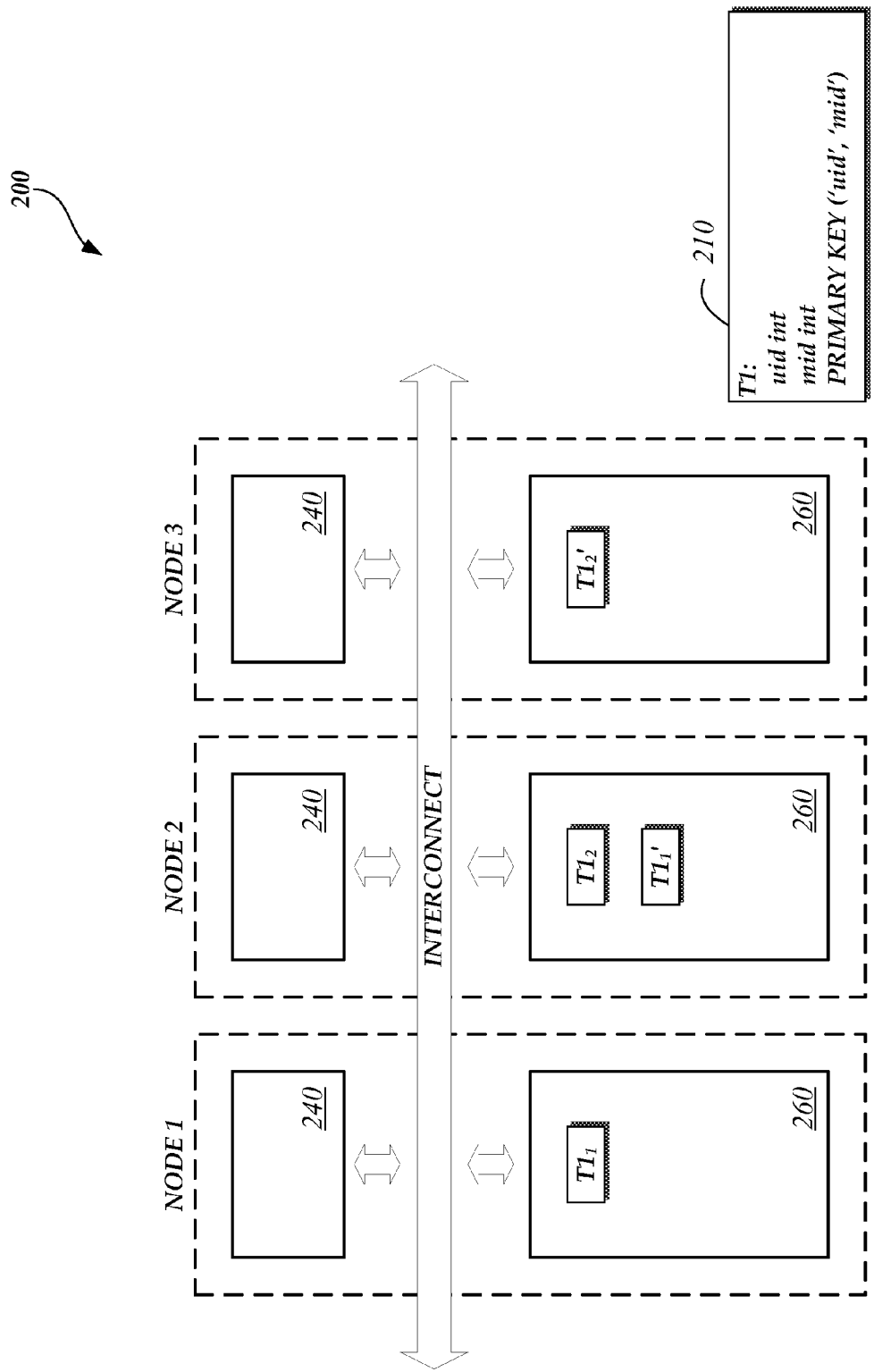
FIG. 2 is a schematic diagram of a data layout for a table of a relational database in accordance with one embodiment.

FIG. 2 is a schematic diagram of a data layout 200 for a table of a relational database in accordance with one embodiment. Schema 210 shows a physical representation of the data layout for a simple table, T1. The database system 100 can partition tables into objects called slices and those slices can have replicas for data redundancy. In the illustrated example, table T1 has two slices: $T1_1$ and $T1_2$. $T1_1$ resides on node 1, and $T1_2$ resides on node 2. Additionally, each slice has a replica labeled $T1_1'$ and $T1_2'$, respectively. The replicas of a slice can contain identical data and can be used interchangeably by the database system 100. There can be any number of slices per table, which can be determined by table size or other database statistics and parameters. The database system 100 can automatically and transparently split slices when they get too large. The number of slices can also be set by the user. The data placement of these slices and replicas throughout the database system 100 can be dynamically computed and updated. Slices can be moved while the database system 100 is online with no disruption to client queries. When a new node is added to the database system 100, data can be automatically moved there to rebalance the database system 100. When a drive or a node fails, the one or more slices that were contained on the failed device can be automatically reconstructed using the remaining resources in the database system 100.

A data cache in the database system 100 can be local to the node that contains the data. In the illustrated example, the slice $T1_1$ and its related cache reside on node 1. In contrast, a shared disk system, which pulls data to a node on which a query is run, can have high latency due to data movement around the database system 100 when queries are executed. Alternatively, a shared disk system can cache the data on the machine where the query is run. This can create many copies of the same data in cache, greatly reducing cache efficiency.

The distribution of data among the slices can be determined by a distribution function: dist(key). The distribution function can either be range-based or hash-based. The number of components in a compound key contributing to the distribution can be selected. Components that can be used in a compound key can include data values from one or more columns in a representation. In the example in FIG. 2, data can be distributed on ('uid') or the combination ('uid','mid').

Figure 3:
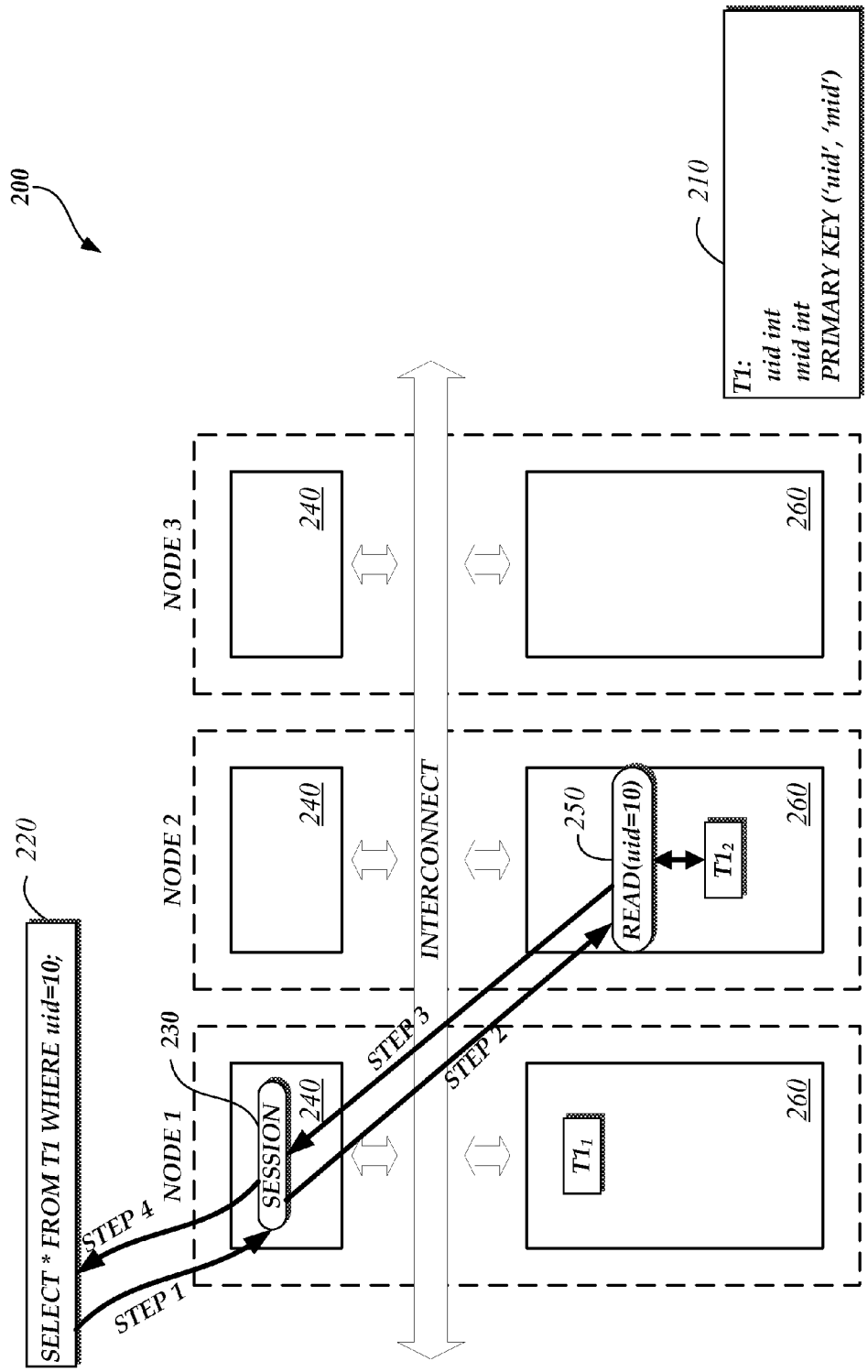
FIG. 3 is a schematic diagram of one example query performed on the table of FIG. 2.

FIG. 3 is a schematic diagram of one example query performed on the table T1 of FIG. 2. In the illustrated example, a client's point select query 220 is processed by the database system 100. For clarity, the replicas $T1_1'$ and $T1_2'$ have been removed from the diagram. In the illustrated example, the query 220 creates the client's session 230 on node 1. In step 1, a database system planner 240 generates a plan by parsing the query 220, creating a query fragment 250. This plan is executed in the execution engine 260. Using the distribution function disquid=10), the database system 100 decides $T1_2$ is the slice that contains the relevant data. In step 2, the query fragment 250, along with any necessary constants (uid=10) is sent to node 2. In this case, the query fragment 250 performs a container read, finds all rows matching the constraint uid=10, and returns the rows in step 3. The returned rows are then sent back to the client in step 4. In the illustrated embodiment, the point select query 220 involves no global table or row level locks. Instead, database system 100 performs the query using Multi-Version Concurrency Control (MVCC) to ensure consistent data is returned.

Figure 4:
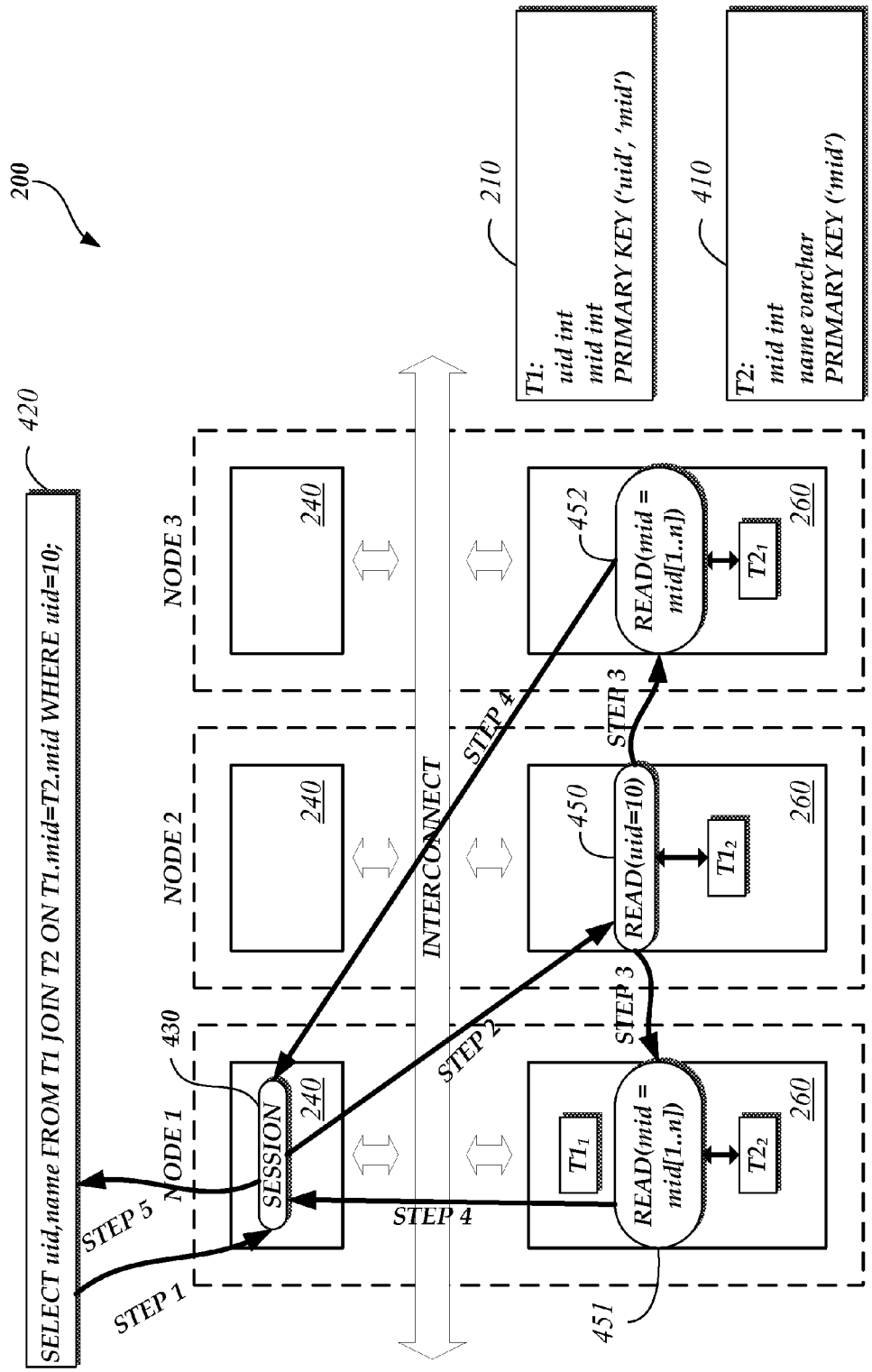
FIG. 4 is a schematic diagram of another example query performed on the table of FIG. 2.
Figure 5:
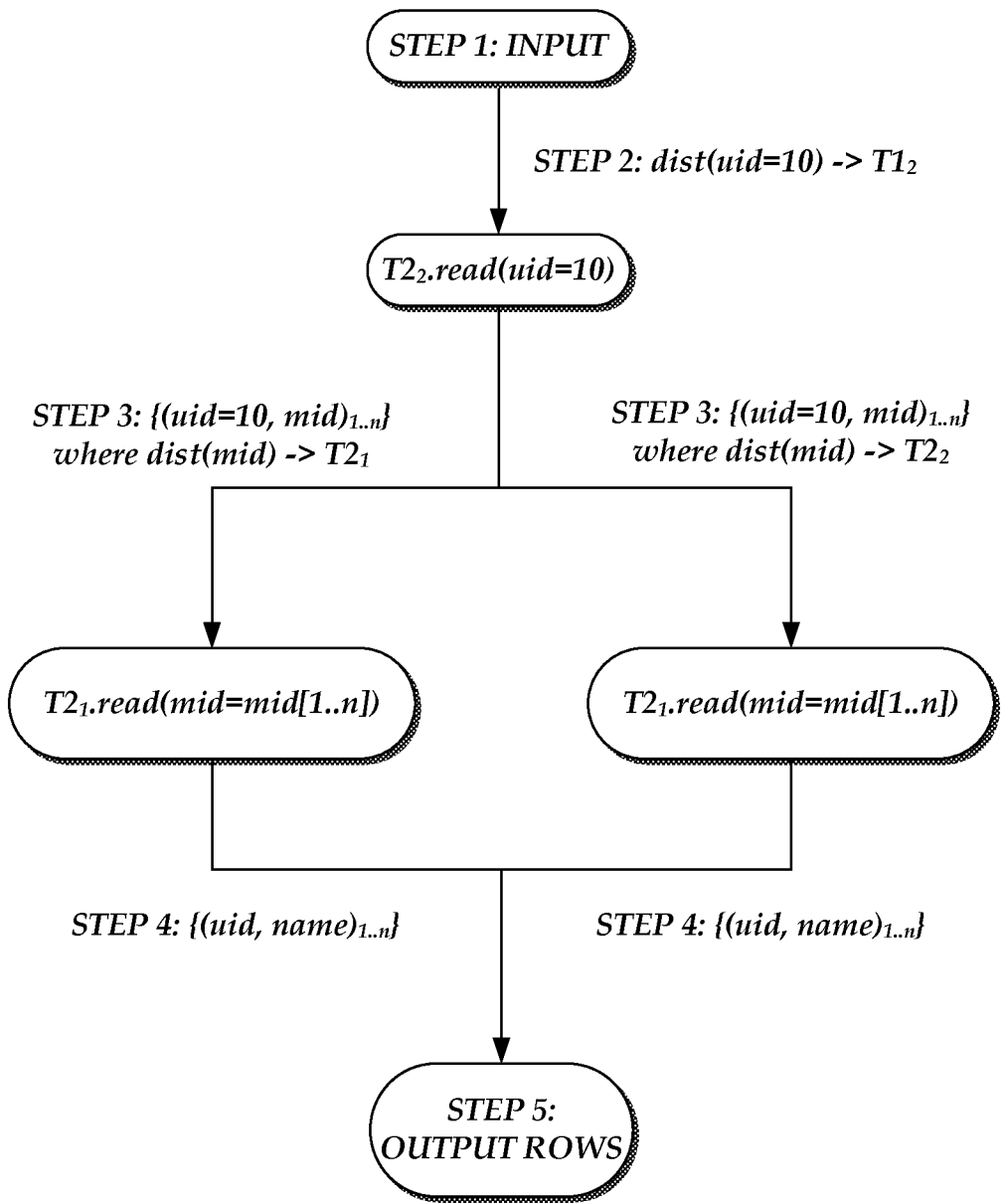
FIG. 5 is a dependency graph of the example query of FIG. 4.

FIG. 4 is a schematic diagram of another example query 420 performed on the table T1 of FIG. 2. FIG. 4 illustrates a two-table join query 420 with a constraint. Schema 410 shows a physical representation of the data layout for another table, T2. In the illustrated example, as with the point select query 220 of FIG. 3, the query comes in, gets compiled down to machine code query fragments 450, 451, 452, and is routed to nodes 1, 2, and 3 for query resolution. The rows are sent back to the client. In the illustrated example, the planner 240 has flexibility in join order, access path (which index it uses), general operation ordering, distribution, and parallelism. The database system 100 can use a variety of statistics to make intelligent decisions when making a plan whereby query fragments are generated and routed. For this example, the generated plan is illustrated in FIG. 5 as a dependency graph. The numbered steps in the dependency graph correspond with the steps in the physical representation.

FIG. 5 is a dependency graph of the example query of FIG. 4. In step 1, the SQL query 420 is compiled to machine code. In step 2, the query fragment 450 is sent to a slice determined by the distribution function disquid=10) of the first table of the join operation. There, the query fragment 450 finds all rows that match the constraint uid=10. In step 3, the database system 100 forwards the matched rows returned by query fragment 450 along with additional query fragments 451, 452 to the appropriate slices. The database system uses a distribution function dist(mid) to decide where to forward each row retrieved from the slice $T1_2$. Slices $T2_1$ and $T2_2$ are read to find the rows that match the T1.mid=T2.mid constraint. In step 4, the appropriate result rows are sent to the session 430. In step 5, the result is sent to the client. In the illustrated embodiment, only the relevant columns of the necessary rows are sent at each stage. Thus, (uid,mid) is sent in step 3 and (uid,name) is sent in step 4.

Embodiments of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A Local Area Network (LAN) or Wide Area Network (WAN) may be a corporate computing network, including access to the Internet, to which computers and computing devices comprising the system are connected. In one embodiment, the LAN conforms to the Transmission Control Protocol/Internet Protocol (TCP/IP) industry standard.

A microprocessor may be any conventional general purpose single- or multi-chip microprocessor such as a Pentium® processor, Itanium® processor or an ALPHA® processor. In addition, the microprocessor may be any conventional special purpose microprocessor such as a digital signal processor (DSP) or a graphics processor.

Embodiments of the system are comprised of various modules as discussed in detail below. As can be appreciated by one of ordinary skill in the art, each of the modules can comprise various sub-routines, procedures, definitional statements and macros. Each of the modules are typically separately compiled and linked into a single executable program. Therefore, the following description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as LINUX, UNIX or MICROSOFT WINDOWS®. The system may be written in any conventional programming language such as C, C++, BASIC, Pascal, Perl, or Java, and run on a conventional operating system.

Any embodiment of the invention disclosed herein may be implemented as a method, apparatus or article of manufacture using standard programming or engineering techniques to produce software, firmware, hardware, or any combination thereof. The term "article of manufacture" as used herein includes code or logic implemented in hardware or computer readable media such as optical storage devices, and volatile or non-volatile memory devices. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

Redistribution Systems and Methods

Rows of data can be distributed among slices of a representation in a database based on criteria such as, for example, hashes of a key value in the row or by a range into which a key value in the row falls. Depending on the specific data in the database, however, a given distribution criterion may not create an even distribution of data among the slices. When data is not evenly distributed according to one distribution criterion, the data can be redistributed according to another distribution criterion, which can result in a more even distribution.

FIG. 6 is a schematic diagram illustrating a state of a messages table 600 in accordance with one embodiment. The systems and methods described herein can be used to redistribute data in many different possible representations. For the purpose of demonstration, and without limitation, the messages table 600 is described herein as an exemplary representation for which redistribution systems and methods can be advantageous. The messages table 600 is an example table that has been highly simplified for clarity. A person having ordinary skill in the art will appreciate that systems and methods presented herein are applicable to representations with far greater complexity and size.

In one embodiment, the messages table 600 can store electronic messages for users in a computer system. As illustrated, the messages table 600 includes a plurality of columns 610, 620, 630, 640, and 650 and a plurality of rows 660a-f. In an embodiment, the messages table 600 can be created using the following SQL command:

```
CREATE TABLE 'messages' (
  'mid' int(11) not null,
  'uid' int(11),
  'read' tinyint(4),
  'locked' int(11),
  'text' varchar(65535) CHARACTER SET utf8,
  PRIMARY KEY ('mid') /*$ DISTRIBUTE=1 */,
  KEY 'uid_index' ('uid','read') /*$ DISTRIBUTE=2 */,
  KEY 'locked_index' ('locked') /*$ DISTRIBUTE=1 */ )
```

A 'mid' column 610 can store a numeric message ID. The 'mid' column 610 can be the primary key, which can be used to uniquely identify a row in the messages table 600. A 'uid' column 620 can store a numeric user ID, which can represent the user to whom a message has been sent. A 'read' column 630 can store a value indicating whether a message has been read by a user. A 'locked' column 640 can store a value indicating whether a row has been locked by a computing process for exclusive access to the row. A 'text' column 650 can store a text string containing a message. In addition to the primary key 'mid', the messages table 600 can contain two additional keys 'uid_index', illustrated in FIG. 7, and 'locked_index', illustrated in FIG. 8.

FIG. 7 is a schematic diagram illustrating a state of a uid_index representation 700 of the messages table 600 of FIG. 6. In one embodiment, the uid_index representation 700 can allow a database user to search for read or unread messages by the user to which those messages are addressed. As illustrated, the uid_index representation 700 includes a plurality of columns 610, 620, 630, and a plurality of rows 710a-f.

The uid_index representation 700 includes the 'uid' column 620 and the 'read' column 630 from the messages table 600. The uid_index representation 700 can also implicitly include the primary key of the messages table 600. In other words, the uid_index representation 700 can implicitly include the 'mid' column 610 from the messages table 600. In the uid_index representation 700, the rows 710a-f can be sorted first by the 'uid' column, second by the 'read' column, and third by the 'mid' column.

In the illustrated embodiment, values in the columns 620, 630, 610 of the uid_index representation 700 are fairly well distributed. The 'mid' column 610, as the primary key, contains all unique values. The 'read' column 630 contains only two different values (0 and 1) but those two values are equally distributed among rows 710a-f. The 'uid' column 620 contains no more than two rows with the same value.

In one embodiment, the rows 710a-710f of the uid_index representation 700 can be distributed among two or more slices in the database system 100. In various embodiments, the rows 710a-710f of the uid_index representation 700 can be distributed based on a function of the value of the 'uid' column 620 for each row, a function of both the 'uid' column 620 and the 'read' column 630, or a function of the 'uid' column 620, the 'read' column 630, and the 'mid' column 610. These three distribution options can be referred to as "DISTRIBUTE=1", "DISTRIBUTE=2", and "DISTRIBUTE=3," respectively, in reference to the number of columns over which the uid_index representation 700 is being distributed.

For example, in a pre-redistribution state, the uid_index representation 700 can be assigned distribution option "DISTRIBUTE=2" upon creation of the messages table 600. In this example, the rows 710a-710f of the uid_index representation 700 will initially be distributed based on a function of both the 'uid' column 620 and the 'read' column 630, but not based on the 'mid' column 610.

Figures 8, 9:
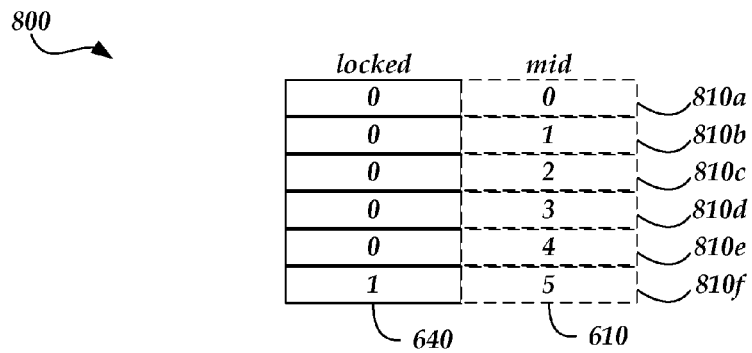
FIG. 8 is a schematic diagram illustrating a state of a locked_index representation of the messages table of FIG. 6.
FIG. 9 is a schematic diagram illustrating a state of a hash ranges table, before redistribution, in accordance with one embodiment.

FIG. 8 is a schematic diagram illustrating a state of a locked_index representation 800 of the messages table 600 of FIG. 6. In one embodiment, the locked_index representation 800 can allow a database user to search locked messages. As illustrated, the locked_index representation 800 includes a plurality of columns 640, 610, and a plurality of rows 810a-f.

The locked_index representation 800 includes the 'locked' column 640. The locked_index representation 800 can also implicitly include the primary key of the messages table 600. In other words, the locked_index representation 800 can implicitly include the 'mid' column 610 from the messages table 600. In the locked_index representation 800, the rows 810a-f can be sorted first by the 'locked' column and second by the 'mid' column.

In the illustrated embodiment, values in the columns 640, 610 of the locked_index representation 800 are poorly distributed. Particularly, the 'locked' column 640 indicates that a large majority of records are unlocked. In other words, the rows 810a-e contain zeros, and only the row 810f contains a 1. On the other hand, the 'mid' column 610, as the primary key, contains all unique values.

In one embodiment, the rows 810a-810f of the locked_index representation 800 can be distributed among two or more slices in the database system 100. In various embodiments, the rows 810a-810f of the locked_index representation 800 can be distributed based on a function of the value of the 'locked' column 640 for each row, or a function of both the 'locked' column 640 and the 'mid' column 610. These two distribution options can be referred to as "DISTRIBUTE=1" and "DISTRIBUTE=2," respectively, in reference to the number of columns over which the locked_index representation 800 is being distributed.

For example, in a pre-redistribution state, the locked_index representation 800 can be assigned distribution option "DISTRIBUTE=1" upon creation of the messages table 600. In this example, the rows 810a-810f of the locked_index representation 700 will initially be distributed based on a function of the 'locked' column 640, but not based on the 'mid' column 610. Given the uneven distribution of values in the 'locked' column 640, however, most of the rows 810a-810f will hash to the same value, resulting in poor distribution of the rows 810a-810f over slices in the database system 100.

In an embodiment, the rows of a representation can be distributed based on a hash function. Preferably, the hash function used is low cost, deterministic, and produces uniform results over its output range. The output of a hash function may be referred to herein as a "column value hash." For the sake of simplicity only, a rudimentary modulus function is used in the following examples. The output of the exemplary modulus hash function used herein is: $f(x)=32x \% 256$, where % denotes the modulus operator. Accordingly, the output of the exemplary hash function ranges from 0 to 255. A person having ordinary skill in the art, however, will recognize that any suitable function can be used to distribute the rows.

In one embodiment, the rows of a representation are distributed according to a table that specifies the slice in which a row is stored based on where the output of the hash function falls within a range of hash values. This table is referred to herein as a "hash ranges table." It will be understood that the various details of the hash ranges table described herein are exemplary, and can be modified to suit different applications.

FIG. 9 is a schematic diagram illustrating a state of a hash ranges table 900, before redistribution, in accordance with one embodiment. As shown, the hash ranges table 900 includes a plurality of columns 910, 920, 930, 940, and 950, and a plurality of rows 960a-960f, and 970a-970d. The hash ranges table 900 can be used as a lookup table when determining where to store a particular row of a representation or where to send a query or query fragment.

For each row of the hash ranges table 900, the 'representation' column 910 stores the name of the representation for which that row contains distribution information. In FIG. 9, distribution information for two representations is shown: the messages table 600 (FIG. 6), and the locked_index representation 800 (FIG. 8). Distribution information for other representations, such as for the uid_index representation 700 (FIG. 7), has been omitted from the hash ranges table 900. Nevertheless, the hash ranges table 900 can contain information for any one or more of the representations in the database.

For each row of the hash ranges table 900, the 'low' column 920 and the 'high' column 930 store the low and high values of a hash output range for which that row contains distribution information. As shown in FIG. 9, the messages table 600 (FIG. 6) is divided into six different hash ranges: 0-31, 32-63, 64-95, 96-127, 128-191, and 192-255. Accordingly, the messages table 600 (FIG. 6) is divided into six different slices. Although the hash ranges for rows 960e and 960f are larger than those for 960a-d, it may be typical and/or preferential to use equally sized hash ranges. The locked_index representation 800 (FIG. 8), on the other hand, is divided into only four different hash ranges: 0-63, 64-127, 127-191, and 192-255. Accordingly, the messages locked_index representation 800 (FIG. 8) is divided into four different slices. In various embodiments, initial hash ranges can be preconfigured by a database administrator or dynamically determined by the database system 100.

For each row of the hash ranges table 900, the 'location' column 940 stores the location of the slice where data that hashes into the hash range of that row is stored. For example, referring to FIG. 6, the messages table 600 is distributed over the 'mid' column 610. In order to determine where to store the data in the row 660a, the value of the 'mid' column 610 is hashed. According to the exemplary hash function f(x)=32x % 265, the output of the hash function would be 0. Because the row 660a is in the messages table 600, the hash output 0 is compared to the hash ranges in rows 960a-f of the hash ranges table 900. In this case, the hash output 0 falls into the hash range 0-31 of row 960a. Accordingly, the row 660a of the messages table 600 is stored in slice 0, as specified by the 'location' column 940 of the row 960a of the hash ranges table 900.

Referring still to FIG. 9, in the illustrated embodiment, the 'location' column 940 refers only to a logical slice number. In various embodiments, the physical location of that slice number can be stored in a separate lookup table, or can be included in the hash ranges table 900. For example, the hash ranges table 900 can include additional columns specifying a node number and drive number where the row data hashing to each hash range is stored. In various embodiments, multiple slices can be stored on the same node and drive, although the slices may or may not have a unique location identifier. Preferably, different slices of the same representation can be stored on different physical nodes in order to increase parallelism. In some embodiments, however, different slices of the same representation can be stored on the same physical nodes.

The 'rows' column 950 stores the number of rows that are stored in the slice for each hash range. In various embodiments, the hash ranges table 900 can additionally or alternatively store the number of bytes stored in each slice. As shown in FIG. 9, the rows 660a-f of the messages table 600 are evenly distributed among the six available slices (slices 0-5), with one row in each slice. In certain embodiments, the even distribution of the rows 660a-f of the messages table 600 can allow greater database performance and efficient use of node resources.

In various embodiments, any number of database statistics discussed below can be stored in the hash ranges table 900. Some embodiments of the database system 100 are configured to monitor the one or more database statistics only approximately. For example, in an embodiment, database statistics can be stored in a separate statistics table in the database. In another embodiment, database statistics can be stored outside of the database structure, for example, as a program variable in a local memory. In yet another embodiment, database statistics can be stored as meta-data associated with each representation.

Referring to FIG. 8, the rows 810a-f of the locked_index representation 800, on the other hand, are unevenly distributed because the values of the 'locked' column 800 are mostly the same. Because all the rows 810a-f hash to the same slice (slice 10), there may be a disproportionate load on the node that hosts that slice. Accordingly, performance can suffer because there is no opportunity to distribute queries among multiple nodes.

Although the exemplary messages table 600 described herein contains only six rows of data, it will be understood that typical database representations can contain thousands, millions, or billions of rows. Thus, a representation similar to the locked_index representation 800, shown in FIG. 8, can potentially have thousands or millions of rows with the same value, depending on the dataset. The potential performance loss described above with respect to the locked_index representation 800 can be exacerbated as the amount of data grows.

In various embodiments, hash ranges can be split when the slices that they represent grow too large, and/or when redistributing rows in the database. For example, if the slice at location 0 grows past a threshold number of rows (e.g., one million rows), it can be split into two or more slices. In that case, the row 960a, having a hash range of 0-31, can be split into a first row having a hash range of 0-15, and a second row having a hash range of 16-31. In various embodiments, a slice can be split when it passes a threshold amount of memory usage, CPU usage, network traffic, etc. A person having ordinary skill in the art will appreciate that the threshold for splitting a slice can be any appropriate value for the hardware and/or software used.

Simply splitting a slice in this manner, however, may not always be effective in reducing the number of rows in that slice. For example, the locked_index representation 800 (FIG. 8) has all its rows 810a-f in a single slice having a hash range of 0-63, shown in the row 970a (FIG. 9). The row 970a can be split into a first row having a hash range of 0-31, and a second row having a hash range of 32-63. However, all the rows 810a-f in the locked_index representation 800 would still hash to the same slice. Further splits would eventually split the rows 810a-e from the row 810f, but every unlocked row would always hash to the same slice because they all contain the same value in the 'locked' column 640.

In order to allow better distribution of problematic combinations of data and structure, such as that demonstrated by the locked_index representation 800, the data can be redistributed according to a function based on a different number of columns. In the case of the locked_index representation 800, for example, the "DISTRIBUTE" option can be increased from the initial setting of "DISTRIBUTE=1" to "DISTRIBUTE=2." As discussed above with respect to FIG. 8, a setting of "DISTRIBUTE=2" for the locked_index representation 800 would include both the 'locked' column 640 and the 'mid' column 610 in the input to the distribution function. Because the 'mid' column 610 is well distributed, the combination of the 'locked' column 640 and the 'mid' column 610 will provide more even row distribution among the database slices.

Although increasing the number of columns included in the distribution function can potentially provide more even distribution of data over the slices of a representation, doing so can also potentially decrease the ability of a query planner, such as the distributed query planner and compiler 120 (FIG. 1), to selectively route queries and/or query fragments to the appropriate slices. For example, including the 'mid' column 610 in the input to the distribution function for the locked_index representation 800 may help evenly distribute data across all the slices of the locked_index representation 800. If a query requests only locked messages, however, a query planner would not be able to identify a single slice because there could potentially be locked messages on every slice. Accordingly, the query planner would forward the query to every slice. Because there is a trade-off between more even distribution and selective query planning, there may be representations for which it could also be advantageous to reduce the number of columns over which a representation is distributed.

Database Statistics for Use in Redistribution

In an embodiment, the database system 100 can monitor one or more database statistics in order to determine when to redistribute the data in a representation. The database statistics can indicate variation in the distribution of data within a column and variation in the distribution of rows across slices.

The database statistics can include the size of each slice, based on either the number or rows or total memory usage. In various embodiments, the database system 100 can determine when to redistribute data based on one or more of: hash range occupancy ratios for each slice, a list of "hot values" for each column of each slice, the number of distinct values for each column of each slice, probabilistic data distribution of each column in each slice, and a quantile distribution of values for each column of each slice. Some of these statistics will now be described.

The various database statistics described below are presented in the context of one or more concrete examples that are representative of a wide range of possible implementations. In various embodiments, the database system 100 can monitor the one or more database statistics only approximately. For example, the database system 100 might not keep an exact count of the number of rows of data used for each statistic. Instead, in an embodiment, the database system 100 can use a heuristic to estimate the values associated with a statistic. In another embodiment, the database system 100 can round statistic values to a pre-set number of significant digits. In one embodiment, the database system 100 can monitor only orders or magnitude. In embodiments where the database system 100 updates statistics only periodically, the monitored statistics can lag behind the actual state of the system.

FIG. 10 is a schematic diagram illustrating a state of a "hot-list" 1000 for the 'locked' column 640 of the messages table 600 of FIG. 6. The hot-list 1000 includes a plurality of columns 1010, 1020, and rows 1030a-f. The 'value' column 1010 contains the most common values in the 'locked' column 640 of the messages table 600. The 'rows' column 1020 contains the number of rows in which each of the common values appears. The rows 1030a-1030f of the hot-list 1000 are sorted by the 'rows' column 1020.

Although the illustrated hot-list 1000 shows the set of six most common values in the 'locked' column 640, a person having ordinary skill in the art will appreciate that a larger or smaller set of values could be stored in the list. In other words, the "most common" values can be any predefined or configurable number of values. Because the only values in the 'locked' column 640 are '0' and '1', the contents of the rows 1030c-1030f were chosen by sorting the set of numbers with no occurrences in ascending order. In an alternative embodiment, NULL values can be used if there are not enough values with non-zero row counts to populate the hot-list. The database system 100 can update the hot-list 1000 periodically, once every set number of database writes, etc.

The database system 100 can use the hot-list 1000 to determine the "lumpiness" of the 'locked' column 640 of the messages table 600. For example, the database system 100 can take the number of rows in which the top value appears, '5', divided by the number of rows in which the second most common value appears, '1', to calculate a lumpiness metric, in this case, 5. If the lumpiness metric for the 'locked' column 640 surpasses a threshold value, and the locked_index representation 800 is distributed only over the 'locked' column 640, the database system 100 can increase the number of columns over which the locked_index representation 800 is distributed and redistribute the rows 810a-f. In various embodiments, alternative or additional lumpiness metrics can include dividing the number of rows in which the most common value appears by the number of rows in which the least common value (from the values in the hot-list) appears (this ratio can be considered infinite or undefined for the hot-list 1000 of FIG. 10), the standard deviation of the 'rows' column 1020, etc.

FIG. 11 is a schematic diagram illustrating a state of a hot-list 1100 for the 'mid' column 610 of the messages table of FIG. 6. The hot-list 1100 includes a plurality of columns 1110, 1120, and rows 1130a-f. The 'value' column 1110 contains the most common values in the 'mid' column 610 of the messages table 600. The 'rows' column 1120 contains the number of rows in which each of the common values appears. The rows 1130a-1130h of the hot-list 1100 are sorted by the 'rows' column 1120.

Although the illustrated hot-list 1100 shows the set of six most common values in the 'mid' column 610, a person having ordinary skill in the art will appreciate that appreciate that a larger or smaller set of values could be stored in the list. The database system 100 can update the hot-list 1100 periodically, once every set number of database writes, etc.

Referring still to FIGS. 6 and 11, the database system 100 can use the hot-list 1100 to determine the "lumpiness" of the 'mid' column 610 of the messages table 600. For example, the database system 100 can take the number of rows in which the top value appears, '1', divided by the number of rows in which the second most common value appears, '1', to calculate a lumpiness metric, in this case, 1. Because the lumpiness metric for the 'mid' column 610 is likely to be low, indicating uniformity of distribution, the database system 100 can predict that including the 'mid' column 610 in the distribution function for a "lumpy" representation will help to redistribute that data in that representation better.

For example, if the lumpiness metric for the 'locked' column 640 surpasses a threshold value, and the locked_index representation 800 (FIG. 8) is distributed only over the 'locked' column 640, the database system 100 can include the 'mid' column 610 in the set of columns over which the locked_index representation 800 is distributed and redistribute the rows 810a-f. In various embodiments, alternative or additional lumpiness metrics can include dividing the number of rows in which the most common value (e.g., in column 1010 or 1110) appears by the number of rows in which the least common value appears, the standard deviation of the 'rows' column 1120, etc.

FIG. 12 is a schematic diagram illustrating a state of a slice range weight table 1200, before redistribution, for the locked_index representation 800 of FIG. 8. The slice range weight table 1200 includes a plurality of columns 1210, 1220, 1230, 1240, and rows 1250a-d. The 'slice' column 1210 contains the logical slice number for each of the slices over which the locked_index representation 800 is distributed. The 'hashes' column 1220 contains the size of the hash range corresponding to each slice over which the locked_index representation 800 is distributed. The 'rows' column 1230 contains the number of rows that are stored in each of the slices over which the locked_index representation 800 is distributed. The 'ratio' column 1240 contains the ratio of the number of rows stored in each slice to the size of the hash range for that slice. There is one row 1250a-d for each slice of the slices over which the locked_index representation 800 is distributed.

As illustrated, the 'ratio' column 1240 is calculated by dividing the value in the 'rows' column 1230 by the value in the 'hashes' column 1220 for each of the rows 1250a-d in the slice range weight table 1200. Accordingly, the 'ratio' column 1240 represents a sort of occupancy metric for the slices with respect to the hashing algorithm. A person having ordinary skill in the art will appreciate that the inverse calculation could be used to similar effect (i.e., the number of hashes divided by the number of rows).

The database system 100 can use the slice range weight table 1200 to determine the lumpiness of the locked_index representation 800. For example, the database system 100 can take the highest ratio, '0.078125', divided by the lowest ratio '0', to calculate a lumpiness metric, in this case undefined, which the database system 100 can interpret as extreme lumpiness. If this lumpiness metric for the locked_index representation 800 surpasses a threshold value, the database system 100 can increase the number of columns over which the locked_index representation 800 is distributed and redistribute the rows 810a-f. In various embodiments, alternative or additional lumpiness metrics can include dividing the highest ratio by the second highest ratio, the standard deviation of the 'ratio' column 1240, etc.

FIG. 13 is a schematic diagram illustrating a state of a slice range weight table 1300 for the messages table 600 of FIG. 6. The slice range weight table 1300 includes a plurality of columns 1310, 1320, 1330, 1340, and rows 1350a-f. The 'slice' column 1310 contains the logical slice number for each of the slices over which the messages table 600 is distributed. The 'hashes' column 1320 contains the size of the hash range corresponding to each slice over which the messages table 600 is distributed. The 'rows' column 1330 contains the number of rows that are stored in each of the slices over which the messages table 600 is distributed. The 'ratio' column 1340 contains the ratio of the number of rows stored in each slice, to the size of the hash range for that slice. There is one row 1350a-f for each slice of the slices over which the messages table 600 is distributed.

As illustrated, the 'ratio' column 1340 is calculated by dividing the value in the 'rows' column 1330 by the value in the 'hashes' column 1320 for each of the rows 1350a-f in the slice range weight table 1300. Accordingly, the 'ratio' column 1340 represents a sort of occupancy metric for the slices with respect to the hashing algorithm. A person having ordinary skill in the art will appreciate that the inverse calculation could be used to similar effect.

The database system 100 can use the slice range weight table 1300 to determine the lumpiness of the messages table 600. For example, the database system 100 can take the highest ratio, '0.03125', divided by the lowest ratio '015625', to calculate a lumpiness metric, in this case 2, which the database system 100 can interpret as low lumpiness. This is expected since the message table 600 is distributed over the primary key 'mid'. In various embodiments, alternative or additional lumpiness metrics can include dividing the highest ratio by the second highest ratio, the standard deviation of the 'ratio' column 1340, etc.

If a lumpiness metric for a representation goes below a lower threshold value, the database system 100 can decrease the number of columns over which that representation is distributed. For example, a representation distributed over two columns with a low lumpiness metric could be redistributed over one column. In some cases, decreasing the number of columns over which a representation is distributed can allow the database system 100 to route queries to an isolated set of slices, potentially reducing system overhead and increasing performance.

Figure 14:
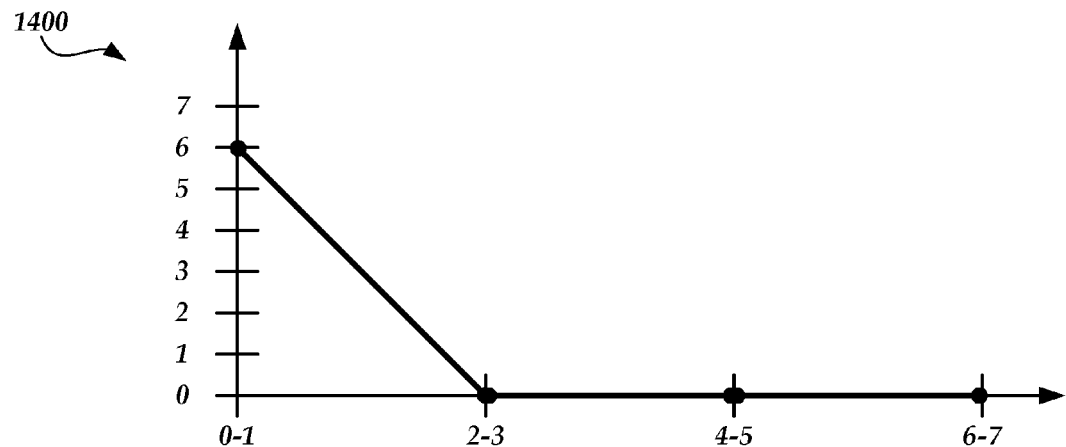
FIG. 14 is a graph illustrating a state of a quantile statistic for the 'locked' column of the messages table of FIG. 6.

FIG. 14 is a graph 1400 illustrating a state of a quantile statistic for the 'locked' column 640 of the messages table 600 of FIG. 6. The graph 1400 can be a histogram showing the distribution of data values in the 'locked' column 640 over the range of values that can potentially be stored in the data type assigned to the 'locked' column 640. In a q-quantile, ordered data is divided into q substantially equal-sized data subsets. In the illustrated example, q is 4, and the 4-quantile is called a quartile. The x-axis of the graph 1400 shows four quartiles of potential values that the 'locked' column 640 can take. In the illustrated embodiment, the 'locked' column 640 is assumed to store values as a 3-bit integer, for simplicity. Accordingly, the values in the 'locked' column 640 can range from 0-7. A person having ordinary skill in the art will appreciate that different sized data types and q-quantile ranges can be used.

The y-axis of the graph 1400 shows the number of rows falling into each quartile range. Because the 'locked' column 640 contains mostly zeros, the graph 1400 is uneven. The database system 100 can use the quantile distribution data to determine the lumpiness of the 'locked' column 640 of the messages table 600. For example, the database system 100 can take the number of rows in the quantile with the most rows, '6', divided by the number of rows in the quantile with the fewest rows, '0', to calculate a lumpiness metric, in this case undefined, which the database system 100 can interpret as extreme lumpiness. If the lumpiness metric for the 'locked' column 640 surpasses a threshold value, and the locked_index representation 800 is distributed only over the 'locked' column 640, the database system 100 can increase the number of columns over which the locked_index representation 800 is distributed and redistribute the rows 810a-f. In various embodiments, alternative or additional lumpiness metrics can include dividing the number of rows in the quantile with the most rows by the number of rows in the quantile with the fewest rows, the standard deviation of the number of rows in each quantile, etc.

Figure 15:
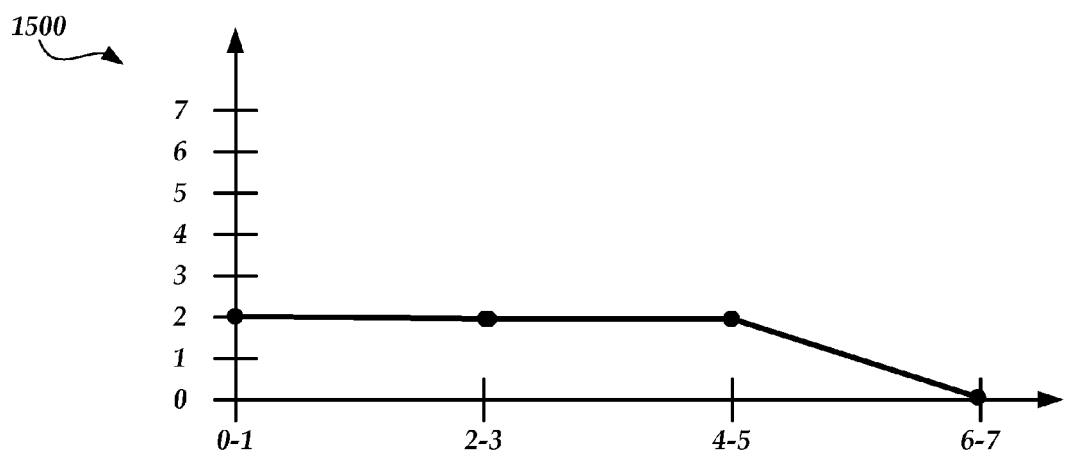
FIG. 15 is a graph illustrating a state of a quantile statistic for the 'mid' column of the messages table of FIG. 6.

FIG. 15 is a graph 1500 illustrating a state of a quantile statistic for the 'mid' column 610 of the messages table 600 of FIG. 6. The graph 1500 can be a histogram showing the distribution of data values in the 'mid' column 640 over the range of values that can potentially be stored in the data type assigned to the 'mid' column 640. The x-axis of the graph 1500 shows four quartiles of potential values that the 'mid' column 610 can take. In the illustrated embodiment, the 'mid' column 640 is assumed to store values as a 3-bit integer, for simplicity. Accordingly, the values in the 'mid' column 610 can range from 0-7. A person having ordinary skill in the art will appreciate that different sized data types and q-quantile ranges can be used.

The y-axis of the graph 1500 shows the number of rows falling into each quartile range. Because the 'mid' column 610 is fairly uniform, the graph 1500 is also uniform. The database system 100 can use the quantile distribution data to determine the lumpiness of the 'mid' column 610 of the messages table 600. For example, the database system 100 can take the number of rows in the quantile with the most rows, '2', divided by the number of rows in the quantile with the second most rows, '2', to calculate a lumpiness metric, in this case 1, which the database system 100 can interpret as low lumpiness. Note, however, that using other metrics (such as dividing the number of rows in the quantile with the most rows by the number of rows in the quantile with the fewest rows) on this exemplary dataset could result in a metric indicating high lumpiness. This is an artifact of the small size of the exemplary messages table 600. Nevertheless, the database system 100 can combine one or more metrics and statistics described herein to reduce the impact of such cases. For example, the database system 100 can average the lumpiness metrics from hot-list values, slice range weights, and quantile distribution data in order to calculate a combined metric. Alternatively, the database system 100 can use a voting system such as using the result of two lumpiness metrics that agree and ignoring one that does not.

The database system 100 can monitor the statistics disclosed herein, which can include lumpiness metrics calculated from other statistics, to detect a redistribution condition. A redistribution condition can occur when a monitored statistic surpasses (or, in some cases, is less than) a threshold value. In one embodiment, a redistribution condition can occur when a monitored statistic surpasses a threshold value in combination with the occurrence of a system event, such as the splitting of a slice. In one embodiment, a redistribution condition can occur when a monitored statistic surpasses (or falls below, depending on the statistic) a threshold value in combination with the size of a representation being greater than a specific size such as, for example, 100 megabytes. In some embodiments, the database system 100 monitors and updates statistics only periodically.

In one embodiment, a redistribution condition can occur when the standard deviation of slice sizes for a given representation, divided by the mean of the slice sizes, is greater than a configurable parameter such as, for example, 0.6. In another embodiment, a redistribution condition can occur when the number of rows in the largest slice of a given representation, divided by the number of rows in the smallest slice of a given representation, is greater than a threshold such as, for example, 100. In other embodiments, the database system 100 can monitor redistribution conditions that occur for a given data type and correlate that data type with a likelihood for having a high lumpiness. Accordingly, the database system 100 can predicatively increase the number of columns over which a representation containing that data type is distributed.

After detecting a redistribution condition with respect to a particular representation, the database system 100 can respond to the redistribution by adjusting the number of columns over which that representation is distributed. For example, as discussed above with respect to FIG. 12, the database system 100 can determine that the slice range weight table 1200 indicates a lumpiness for the locked_index representation 800 that surpasses a threshold value. The database system 100 can then increase the "DISTRIBUTE" option for the locked_index representation 800 (FIG. 8) from the initial setting of "DISTRIBUTE=1" to "DISTRIBUTE=2." Accordingly, the locked_index representation 800 would include both the 'locked' column 640 and the 'mid' column 610 in the input to the distribution function. Subsequently, the database system 100 can redistribute the rows 810a-f of the locked_index representation 800 according to an updated distribution function.

As an example, during redistribution, in order to determine where to store the data in the row 810f (FIG. 8), the value of the 'locked' column 640 is combined with the 'mid' column 610, and the result is hashed. For the sake of simplicity only, a rudimentary combination function is used in the following example. Specifically, the value of the 'locked' column 640, '1', is simply concatenated with the value of the 'mid' column 610, '5', resulting in 15. A person having ordinary skill in the art will appreciate that other concatenation and distribution functions can be used. For example, a two-input hash function can be used instead of concatenation.

Referring to FIGS. 8 and 9, according to the exemplary hash function f(x)=32x % 265, the output of the hash function would be 224. Because the row 810f is in the locked_index representation 800, the hash output 224 is compared to the hash ranges in rows 970a-d of the hash ranges table 900. In this case, the hash output 224 falls into the hash range 192-255 of row 970d. Accordingly, the row 810f of the locked_index representation 800 is redistributed to a new slice as specified by the 'location' column 940 of the row 970d of the hash ranges table 900. In this particular example, the row 810f would be redistributed to the slice at location 13.

In one embodiment, the database system 100 can redistribute the rows of a representation being redistributed by creating a new slice for each hash range. The database system 100 can then copy each row out of the old slices into the new slices according to the updated distribution function, which will typically use one additional or one less column in the hash input. In one embodiment, the database system 100 can block access to the representation during redistribution by locking the entire representation. Redistribution can be time consuming, however, and this approach could cause undesirable system wait times.

In another embodiment, the database system 100 can allow access to the old slices of the representation while redistributing the rows of the representation to new slices. Such "online" redistribution can be accomplished by creating a plurality of write queues, each write queue associated with a new slice. The database system 100 can then queue writes to the new slices while performing the redistribution. After redistribution, the database system 100 can replay the queued writes to the new slices and finally activate the new slices. The database system 100 can perform the aforementioned online redistribution according to the methods and systems described in the nonprovisional U.S. patent application entitled "SYSTEMS AND METHODS FOR RESLICING DATA IN A RELATIONAL DATABASE," filed Jun. 1, 2011 Ser. No. 13/151,203.

In other embodiments, the database system 100 can redistribute the rows of a representation without creating new slices. Alternatively, the database system 100 can create new slices and then move them back to their original location after redistribution. A person having ordinary skill in the art will appreciate that there are a number of ways to redistribute the data in the original slices.

FIG. 16 is a schematic diagram illustrating a state of the hash ranges table 900 of FIG. 9, after redistribution, in accordance with one embodiment. As shown in FIG. 16, the hash ranges table 900 still includes a plurality of columns 910, 920, 930, 940, 950 and a plurality of rows 960a-f, 980a-d. After redistributing the locked_index representation 800, however, the original rows 970a-d have been replaced with new rows 980a-d. The new rows 980a-d are similar to the original rows 970a-d, but contain new values in the 'location' column 940 and the 'rows' column 950. The 'location' column 940 has changed because new slices were created during redistribution. In some embodiments, the 'location' column 940 will not change because data will be redistributed without creating new slices. The 'rows' column 950 now reflects the fact that the rows 810a-f of the locked_index representation 800 are more evenly distributed among the slices.

FIG. 17 is a schematic diagram illustrating a state of a slice range weight table 1200, after redistribution, for the locked_index representation 800 of FIG. 8. As shown in FIG. 17, the slice range weight table 1200 still includes a plurality of columns 1210, 1220, 1230, 1240. After redistributing the locked_index representation 800, however, the original rows 1250a-d have been replaced with new rows 1260a-d. The new rows 1260a-d are similar to the original rows 1250a-d, but contain new values in the 'rows' column 1230 and the 'ratio' column 1240. The 'rows' column 1230 and the 'ratio' column 1240 now reflect the fact that the rows 810a-f of the locked_index representation 800 are more evenly distributed among the slices.

After redistribution, database system 100 can use the slice range weight table 1200 to determine the lumpiness of the locked_index representation 800. For example, the database system 100 can take the highest ratio, '0.03125', divided by the lowest ratio '0.015625', to calculate a lumpiness metric, 2. The database system 100 can interpret this post-redistribution lumpiness metric as relatively low lumpiness.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more exemplary aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

When implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the present disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of redistributing data in a distributed database comprising a plurality of rows of data distributed across a plurality of slices of a table in the database, the method comprising:

hashing one or more column values in a row into a column value hash;

determining one hash range, out of a plurality of hash ranges, into which the column value hash falls;

assigning the row to one of the slices based on the determined hash range;

distributing the rows of data across the slices according to a first function based on one or more columns of the database, the first function comprising a hash function;

monitoring at least one database statistic indicative of variation in a distribution of the rows of data across the slices, the at least one database statistic comprising a plurality of occupancy ratios, one for each hash range of the plurality of hash ranges, each occupancy ratio comprising a ratio of a total number of rows falling into a hash range to a size of the hash range;

detecting a redistribution condition based on the at least one monitored database statistic; and responding to the detected redistribution condition by redistributing the rows of data across the slices according to a second function based on a different number of columns than the first function, wherein the method is performed by one or more computing devices.

2. The method of claim 1, wherein the first function is based on a set of one or more columns, and the second function is based on the set of one or more columns of the first function, plus at least one additional column.

3. The method of claim 1, wherein the first function is based on a set of one or more columns, and the second function is based on the set of one or more columns of the first function, minus at least one column.

4. The method of claim 1, wherein said monitoring comprises periodically evaluating the at least one database statistic, wherein detecting the redistribution condition comprises detecting that the at least one database statistic exceeds a threshold value.

5. The method of claim 1, wherein detecting the redistribution condition comprises detecting that a largest occupancy ratio of the plurality of occupancy ratios, divided by a smallest occupancy ratio of the plurality of occupancy ratios, is greater than a threshold value.

6. The method of claim 1, wherein the at least one database statistic comprises a total number of rows containing each value in a set of most common values for at least one column of the database.

7. The method of claim 1, wherein the at least one database statistic comprises a number of rows falling into each of a plurality of quantiles of potential values for a column.

8. A method of redistributing data in a distributed database comprising a plurality of rows of data distributed across a plurality of slices of a table in the database, the method comprising:
- distributing the rows of data across the slices according to a first function based on one or more columns of the database;
- monitoring at least one database statistic indicative of variation in a distribution of the rows of data across the slices;
- detecting a redistribution condition based on the at least one monitored database statistic; and
- responding to the detected redistribution condition by redistributing the rows of data across the slices according to a second function based on a different number of columns than the first function,
- wherein:
  - a number of rows of a largest one of the slices is greater than or equal to a number of rows of each of the remaining slices;
  - a number of rows of a smallest one of the slices is less than or equal to a number of rows of each of the remaining slices;
  - the at least one database statistic comprises a ratio of the number of rows of the largest slice to the number of rows of the smallest slice;
  - detecting the redistribution condition comprises detecting that the ratio exceeds a threshold value; and
  - the method is performed by one or more computing devices.

9. The method of claim 1, further comprising splitting one of the slices into a plurality of new slices, wherein detecting the redistribution condition further comprises detecting the splitting of the slice into the plurality of new slices.

10. A method of redistributing data in a distributed database comprising a plurality of rows of data distributed across a plurality of slices of a table in the database, the method comprising:
- distributing the rows of data across the slices according to a first function based on one or more columns of the database;
- monitoring at least one database statistic indicative of variation in a distribution of the rows of data across the slices, the at least one database statistic comprising a first standard deviation of the slices' numbers of rows divided by a mean value of the slices' numbers of rows;
- detecting a redistribution condition based on the at least one monitored database statistic; and
- responding to the detected redistribution condition by redistributing the rows of data across the slices according to a second function based on a different number of columns than the first function,
- wherein the method is performed by one or more computing devices.

11. The method of claim 10, wherein detecting the redistribution condition comprises detecting that the first standard deviation is greater than a threshold.

12. A method of redistributing data in a distributed database comprising a plurality of rows of data distributed across a plurality of slices of a table in the database, the method comprising:
- distributing the rows of data across the slices according to a first function based on one or more columns of the database;
- monitoring at least one database statistic indicative of variation in a distribution of the rows of data across the slices;
- detecting a redistribution condition based on the at least one monitored database statistic; and
- responding to the detected redistribution condition by redistributing the rows of data across the slices according to a second function based on a different number of columns than the first function,
- wherein redistributing comprises:
  - creating a plurality of new slices;
  - creating a plurality of write queues, each write queue associated with a new slice;
  - redistributing the rows of data across the new slices according to the second function;
  - queuing writes to the database into the write queues while redistributing the rows of data across the new slices;
  - replaying the queued writes to the new slices; and
  - activating the new slices,
- wherein the database slices continue to be available for database transactions while the data in the first slice is redistributed to the new slices, and
- wherein the method is performed by one or more computing devices.

13. A distributed database system comprising a plurality of rows of data distributed across a plurality of slices of a table in the database, and one or more processors configured to:
- hash one or more column values in a row into a column value hash;
- determine one hash range, out of a plurality of hash ranges, into which the column value hash falls;
- assign the row to one of the slices based on the determined hash range;
- distribute the rows of data across the slices according to a first function based on one or more columns of the database, the first function comprising a hash function;

monitor at least one database statistic indicative of variation in a distribution of the rows of data across the slices, the at least one database statistic comprising a plurality of occupancy ratios, one for each hash range of the plurality of hash ranges, each occupancy ratio comprising a ratio of a total number of rows falling into a hash range to a size of the hash range;

detect a redistribution condition based on the at least one monitored database statistic; and respond to the detected redistribution condition by redistributing the rows of data across the slices according to a second function based on a different number of columns than the first function.

14. The distributed database system of claim 13, wherein the one or more processors are further configured to detect that a largest occupancy ratio of the plurality of occupancy ratios, divided by a smallest occupancy ratio of the plurality of occupancy ratios, is greater than a threshold value.

15. A computer-readable non-transitory storage medium comprising code capable of causing one or more processors to:

hash one or more column values in a row into a column value hash;

determine one hash range, out of a plurality of hash ranges, into which the column value hash falls;

assign the row to one of the slices based on the determined hash range;

distribute a plurality rows of data across a plurality of slices of a table in a database according to a first function based on one or more columns of the database, the first function comprising a hash function;

monitor at least one database statistic indicative of variation in a distribution of the rows of data across the slices, the at least one database statistic comprising a plurality of occupancy ratios, one for each hash range of the plurality of hash ranges, each occupancy ratio comprising a ratio of a total number of rows falling into a hash range to a size of the hash range;

detect a redistribution condition based on the at least one monitored database statistic; and respond to the detected redistribution condition by redistributing the rows of data across the slices according to a second function based on a different number of columns than the first function.

16. The medium of claim 15, wherein the first function is based on a set of one or more columns, and the second function is based on the set of one or more columns of the first function, plus at least one additional column.

17. The medium of claim 15, wherein said monitoring comprises periodically evaluating the at least one database statistic, wherein detecting the redistribution condition comprises detecting that the at least one database statistic exceeds a threshold value.

18. The medium of claim 15, wherein detecting the redistribution condition comprises detecting that a largest occupancy ratio of the plurality of occupancy ratios, divided by a smallest occupancy ratio of the plurality of occupancy ratios, is greater than a threshold value.

19. The medium of claim 15, wherein the at least one database statistic comprises a total number of rows containing each value in a set of most common values for at least one column of the database.

20. The medium of claim 15, wherein the at least one database statistic comprises a number of rows falling into each of a plurality of quantiles of potential values for a column.

* * * * *

UNITED STATES PATENT AND TRADEMARK OFFICE
CERTIFICATE OF CORRECTION

PATENT NO.       : 8,543,538 B2
APPLICATION NO.  : 13/151189
DATED            : September 24, 2013
INVENTOR(S)      : Frantz et al.

Page 1 of 1

It is certified that error appears in the above-identified patent and that said Letters Patent is hereby corrected as shown below:

In the Specification

In column 4 at line 42, Change "disquid=10)," to --dist(uid=10),--.

Signed and Sealed this
Sixth Day of May, 2014

Michelle K. Lee
*Deputy Director of the United States Patent and Trademark Office*